United States Patent
Godin et al.

(10) Patent No.: US 12,507,040 B2
(45) Date of Patent: Dec. 23, 2025

(54) DISTRIBUTING MULTICAST PACKETS IN INDIVIDUAL PROTOCOL DATA UNIT (PDU) SESSIONS

(71) Applicant: NOKIA TECHNOLOGIES OY, Espoo (FI)

(72) Inventors: Philippe Godin, Versailles (FR); Bruno Landais, Pleumeur-bodou (FR); Horst Thomas Belling, Erding (DE); David Navrátil, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 554 days.

(21) Appl. No.: 17/713,554

(22) Filed: Apr. 5, 2022

(65) Prior Publication Data

US 2022/0322048 A1    Oct. 6, 2022

Related U.S. Application Data

(60) Provisional application No. 63/171,283, filed on Apr. 6, 2021.

(51) Int. Cl.
*H04W 4/06* (2009.01)
*H04W 76/12* (2018.01)
*H04W 76/30* (2018.01)

(52) U.S. Cl.
CPC ............ *H04W 4/06* (2013.01); *H04W 76/12* (2018.02); *H04W 76/30* (2018.02)

(58) Field of Classification Search
None
See application file for complete search history.

(56) References Cited

U.S. PATENT DOCUMENTS 11,246,011 B1 *   2/2022   Satyanarayana ...... H04L 12/185
2018/0192390 A1   7/2018   Li et al.
(Continued)

FOREIGN PATENT DOCUMENTS

CN    111866757 A    10/2020
CN    112105088 A    12/2020
(Continued)

OTHER PUBLICATIONS

Second Office Action dated Mar. 12, 2024 corresponding to Chinese Patent Application No. 202210368595.0, with English summary thereof.
(Continued)

*Primary Examiner* — Christine T Duong
(74) *Attorney, Agent, or Firm* — SQUIRE PATTON BOGGS (US) LLP

(57) ABSTRACT

Systems, methods, apparatuses, and computer program products for distributing multicast packets in individual protocol data unit (PDU) sessions are provided. One method may include receiving, at a user plane node, a request from a session management node, to receive packets for a multicast session and/or to send packets from the multicast session within a protocol data unit (PDU) session. The method may also include determining whether the user plane node was already configured to receive incoming packets for the multicast session, and informing the session management node as to whether the user plane node was already configured to receive the incoming packets for the multicast session.

18 Claims, 15 Drawing Sheets

(56) References Cited

U.S. PATENT DOCUMENTS

2019/0098536 A1* 3/2019 Qiao .............. H04W 36/0016
2020/0351984 A1 11/2020 Talebi Fard et al.

FOREIGN PATENT DOCUMENTS

WO 2019114939 A1 6/2019
WO WO-2020015503 A1 * 1/2020

OTHER PUBLICATIONS

Office Action and Search Report dated Jul. 28, 2023, corresponding to Chinese Patent Application No. 202210368595.0.
Communication under Rule 71(3) EPC dated Jun. 11, 2024 corresponding to European Patent Application No. 22166875.9.
3rd Generation Partnership Project; Technical Specification Group Services and System Aspects; System architecture for the 5G System (5GS); Stage 2 (Release 16); 3GPP TS 23.501, V16.7.0, Dec. 2020.
3rd Generation Partnership Project; Technical Specification Group Services and System Aspects; Procedures for the 5G System (5GS); Stage 2 (Release 16); 3GPP TS 23.502, V16.7.1, Jan. 2021.
3rd Generation Partnership Project; Technical Specification Group Services and System Aspects; Study on architectural enhancements for 5G multicast-broadcast services (Release 17); 3GPP TR 23.757, V0.4.0, Jun. 2020.
3rd Generation Partnership Project; Technical Specification Group Core Network and Terminals; Interface between the Control Plane and the User Plane Nodes; Stage 3 (Release 16); 3GPP TS 29.244, V16.6.0, Dec. 2020.
Extended Search Report and Written Opinion dated Aug. 29, 2022, corresponding to European Patent Application No. 22166875.9.
Communication under Rule 71(3) EPC dated Nov. 11, 2024 corresponding to European Patent Application No. 22166875.9.
Indian Office Action, with full English translation, corresponding to Indian Application No. 202214020686, dated Oct. 30, 2025.

* cited by examiner

DISTRIBUTING MULTICAST PACKETS IN INDIVIDUAL PROTOCOL DATA UNIT (PDU) SESSIONS

CROSS-REFERENCE TO RELATED APPLICATIONS

This application claims priority from U.S. provisional patent application No. 63/171,283 filed on Apr. 6, 2021. The entire contents of this earlier filed application are hereby incorporated by reference in their entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for distributing multicast packets in individual protocol data unit (PDU) sessions.

BACKGROUND

Examples of mobile or wireless telecommunication systems may include the Universal Mobile Telecommunications System (UNITS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment is directed to a method that may include receiving, at a user plane node, a request from a session management node, to receive packets for a multicast session and/or to send packets from the multicast session within a protocol data unit (PDU) session. The method may also include determining whether the user plane node was already configured to receive incoming packets for the multicast session, and informing the session management node as to whether the user plane node was already configured to receive the incoming packets for the multicast session.

An embodiment may be directed to a method that may include transmitting, to a user plane node, a request for the user plane node to receive packets for a multicast session and/or to send packets from the multicast session within a protocol data unit (PDU) session. The method may also include receiving, at a session management node, an indication as to whether the user plane node was already configured to receive the incoming packets for the multicast session.

An embodiment may be directed to an apparatus including at least one processor and at least one memory comprising computer program code. The at least one memory and computer program code configured, with the at least one processor, to cause the apparatus at least to receive a request, from a session management node, to receive packets for a multicast session and/or to send packets from the multicast session within a protocol data unit (PDU) session, to determine whether the apparatus was already configured to receive incoming packets for the multicast session, and to inform the session management node as to whether the apparatus was already configured to receive the incoming packets for the multicast session.

An embodiment may be directed to an apparatus including at least one processor and at least one memory comprising computer program code. The at least one memory and computer program code configured, with the at least one processor, to cause the apparatus at least to transmit, to a user plane node, a request for the user plane node to receive packets for a multicast session and/or to send packets from the multicast session within a protocol data unit (PDU) session, and to receive an indication as to whether the user plane node was already configured to receive the incoming packets for the multicast session.

An embodiment may be directed to an apparatus including means for receiving a request, from a session management node, to receive packets for a multicast session and/or to send packets from the multicast session within a protocol data unit (PDU) session, means for determining whether the apparatus was already configured to receive incoming packets for the multicast session, and means for informing the session management node as to whether the apparatus was already configured to receive the incoming packets for the multicast session.

An embodiment may be directed to an apparatus including means for transmitting, to a user plane node, a request for the user plane node to receive packets for a multicast session and/or to send packets from the multicast session within a protocol data unit (PDU) session, and means for receiving an indication as to whether the user plane node was already configured to receive the incoming packets for the multicast session.

BRIEF DESCRIPTION OF THE DRAWINGS

For proper understanding of example embodiments, reference should be made to the accompanying drawings, wherein.

DETAILED DESCRIPTION

Figure 1:
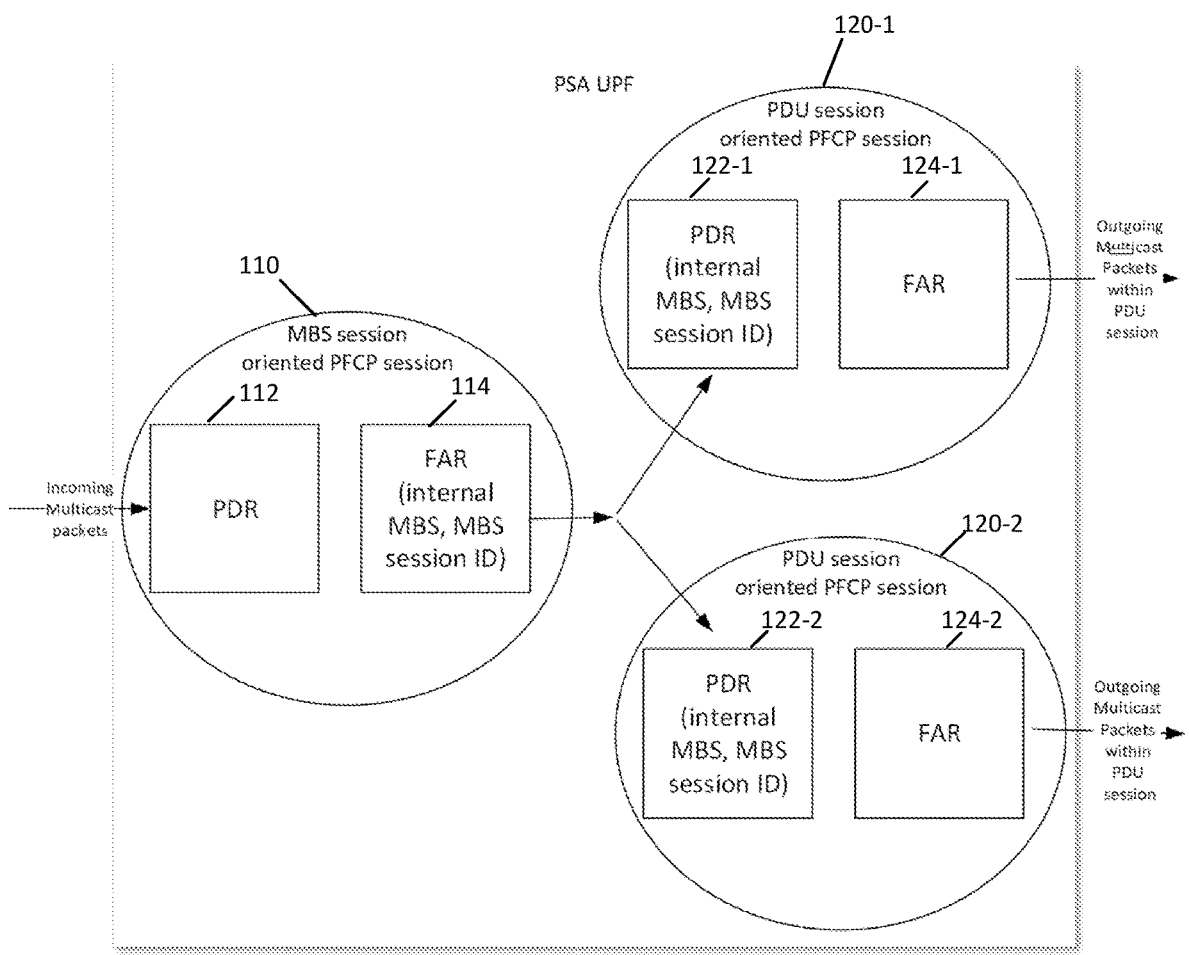
FIG. 1 illustrates an example system diagram depicting the handling of incoming multicast packets, according to one example embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for distributing multicast packets in individual protocol data unit (PDU) sessions, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

The feature of multicast broadcast service (MBS) is currently specified in 3GPP Release-17 in TR 23.757-040. For multicast service, two delivery modes are foreseen: MBS shared delivery and MBS individual delivery. 3GPP has agreed that, for MBS individual delivery, the multicast packets are delivered to the UE over a unicast protocol data unit (PDU) session from PDU session anchor (PSA) user plane function (UPF) to UE. 3GPP has also agreed that the multicast packets should be delivered over a general packet radio service (GPRS) tunneling protocol (GTP) tunnel between multicast broadcast (MB)-UPF and PSA UPF.

Such individual delivery may occur under different use cases. For example, one use case is the joining of the UE in a non-MBS supporting node. Another example use case is mobility between an MBS supporting node and a non-MBS supporting node.

For example, 3GPP has agreed that, to enable mobility of a UE from a MBS supporting radio access network (RAN) node to non-supporting RAN node, a unicast QoS flow will be associated to an MBS flow. This unicast QoS flow is setup from PSA UPF 1 to RAN and need not receive data as long as the UE is in an MBS supporting RAN node. The unicast QoS flow is associated with a PDU session associated with the MBS session. When the UE moves to a non-supporting RAN node, the serving session management function (SMF) 1 (serving the PDU session associated with the MBS session) ensures that this PDU session, and more precisely the PSA UPF involved in this PDU session, receives multicast packets of the MBS session coming from the MB-UPF over a GTP tunnel. For this, the SMF 1 can receive DL tunnel endpoint identifier (TEID) and an internet protocol address from PSA UPF 1 and send it to MB-UPF via MB-SMF. It is noted that the packet forwarding control protocol (PFCP) used on the interface between the SMF and the PSA-UPF is specified in 3GPP TS 23.501 and 3GPP TS 29.244.

However, there is currently no solution to enable the setup, release and management of the GTP tunnel between the MB-UPF and the PSA UPF and the associated context in the PSA UPF. Taking the example of individual delivery for mobility, when the UE moves from a supporting RAN node to a non-supporting RAN node, SMF 1 needs to tell the serving PSA UPF 1 to start delivering traffic of an MBS session 1 to the individual UE 1 over a particular PDU session 1. The issue is that the SMF1 does not know if the PSA UPF1 already received the multicast packets from MB-UPF. This is because PSA UPF1 may already have received a request from an SMF2 to start delivering the packets for the same MBS session 1 for a UE2 over a PDU session 2. SMF1 therefore cannot tell MB-SMF/MB-UPF whether to create a tunnel between MB-UPF and PSA UPF 1.

Taking again the example of individual delivery during mobility, when the UE moves from a non-supporting RAN node to a supporting RAN node, SMF 1 needs to tell the serving PSA UPF 1 to stop delivering traffic of an MBS session 1 to the individual UE 1 over a particular PDU session 1. This PSA UPF 1 may, however, still need to continue sending DL MBS traffic to other UEs for which it is also the serving PSA UPF. SMF 1 does not know of the existence of such other UEs because they may be served by other SMF than SMF 1. The SMF 1 however does not know if PSA UPF 1 still needs to receive the multicast packets from MB-UPF. This is because PSA UPF 1 may still need to deliver the packets for the same MBS session 1 for a UE2 over a PDU session 2 managed by an SMF2. SMF 1 therefore cannot tell MB-SMF/MB-UPF whether the tunnel between the MB-UPF and the PSA UPF1 should be kept or released.

In a context where several SMFs can instruct a PSA UPF to start and/or stop distributing packets relating to an MBS session from an MB-UPF to individual PDU sessions, an embodiment may include the PSA UPF coordinating the setup and tear down of resources to receive packets from the MBS session and the associations between those resources, and resources to send those packets related to multiple PDU sessions.

According to certain embodiments, when an SMF requests the PSA UPF to receive packets for a MBS session and/or to send packets for a MBS session within a PDU session, the PSA UPF may check whether it is already configured to receive incoming packets for that MBS session and may inform the SMF about the result of its check.

In some embodiments, when an SMF requests the PSA UPF to terminate forwarding packets for an MBS session to a PDU session, the PSA UPF may check whether there are still other PDU sessions to which packets from the MBS session are to be sent and otherwise informs the SMF whether there are such other PDU sessions.

Certain example embodiments described herein may contemplate using PFCP session related procedures whereby a PFCP session may correspond either to an individual PDU session ("PDU session-oriented") or to an MBS session ("MBS session-oriented"). When the procedures are PDU session oriented, the procedure identifies the PDU session involved. The MBS session associated with the PDU session is identified by the MBS session ID included in the message. When the procedures are MBS session oriented, the procedure identifies the MBS session involved.

According to some embodiments, it may be assumed that there is just one MBS session oriented PFCP session corresponding to a given MBS session, but there can be multiple PDU session oriented PFCP sessions associated with a given MBS session. Different SMFs may control sets out of those PDU session oriented PFCP sessions.

FIG. 1 illustrates an example system diagram depicting the handling of incoming multicast packets, according to one example embodiment. For instance, as illustrated in the example of FIG. 1, the SMF may configure the UPF to forward incoming packets from an MBS session-oriented PFCP session 110 to receive multicasts data to a UPF internal interface for the multicast session by providing a FAR 114 with destination interface set to "MBS internal" and including the MBS session ID. The MBS session oriented PFCP session 110 may also contains a PDR 112 describing the reception of data within a GTP tunnel. The SMF may configure the UPF to forward packets from the UPF internal interface for the multicast session to an outgoing media stream using one or more PDU session oriented PFCP context sessions 120-1, 120-2 by providing a PDR 122-1, 122-2 with source interface set to "MBS internal" and including the MBS session ID and a FAR 124-1, 124-2 describing how to send data in the PDU session.

Certain embodiments may relate to the creation of a context to receive data for a MBS session and/or the configuration of a PDU session to forward data from the MBS session, e.g., via a common tunnel between MB-UPF and UPF, and to the deletion of an association of a PDU session with an MBS session.

Figure 2:
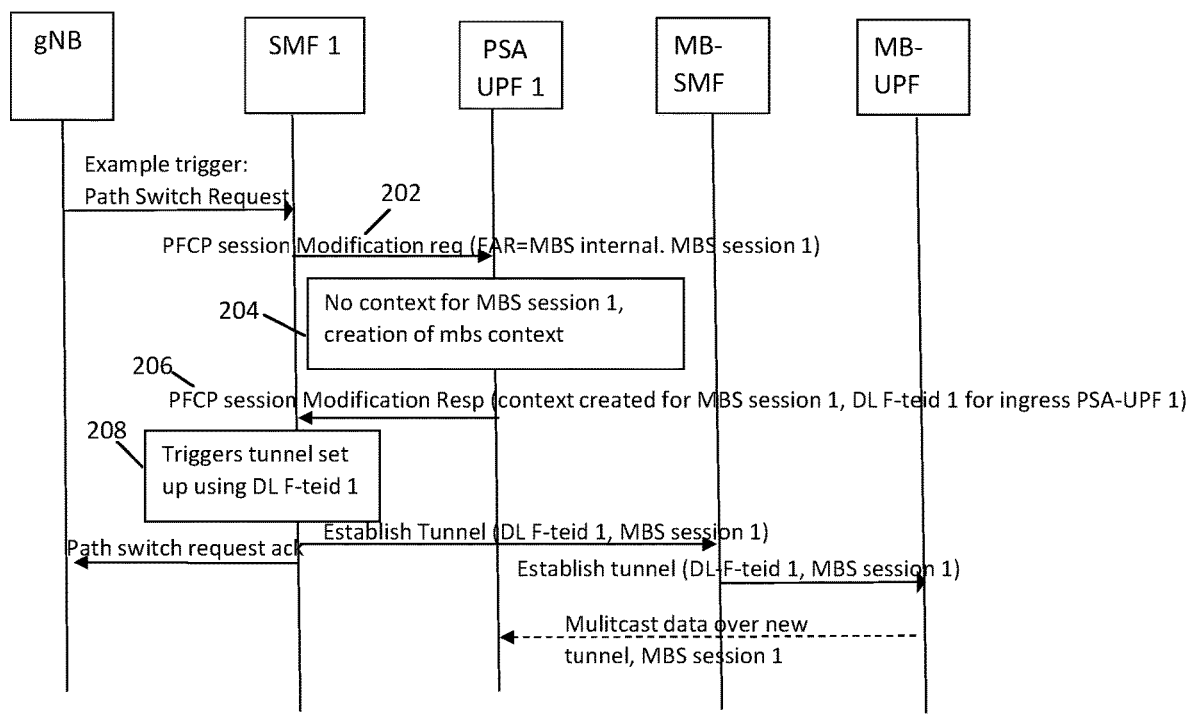
FIG. 2 illustrates an example signaling diagram, according to an embodiment.

FIG. 2 illustrates an example signaling diagram depicting the creation of a context to receive data for a multicast session, according to one embodiment. As illustrated in the example of FIG. 2, at 202, SMF1 may inform PSA UPF 1 that it will start receiving data for a multicast session, e.g., via a PFCP session creation/modification request. In this example, the PFCP session creation/modification request is extended so that SMF1 indicates that PSA UPF 1 will be receiving data for MBS session 1. As further illustrated in the example of FIG. 2, at 204, PSA UPF1 may detect that no MBS context exists yet for the received MBS session 1. In this case, the PSA UPF 1 may create a context for MBS session 1 and, at 206, send back a "context created indicator" and an F-TEID to SMF 1. This may trigger, at 208, SMF1 to set up a tunnel between MB-UPF and PSA UPF 1 using the received F-TEID and the internet protocol address serving as PSA UPF 1 ingress point for receiving the multicast data.

Figure 3:
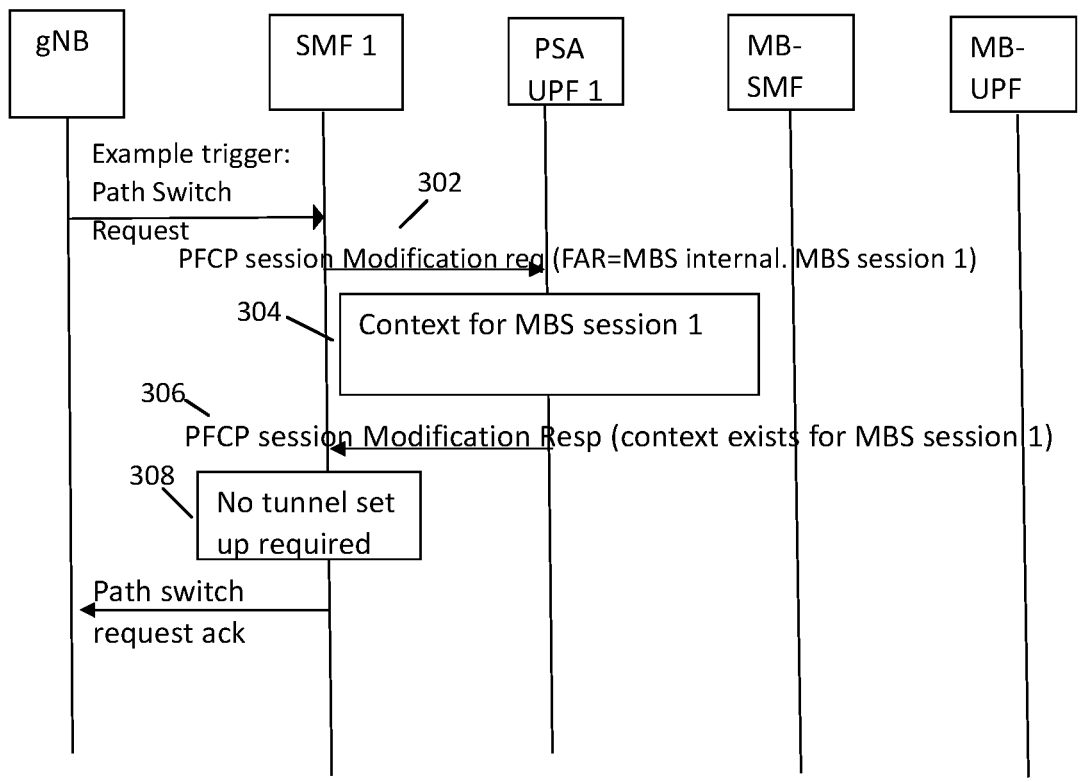
FIG. 3 illustrates an example signaling diagram, according to an embodiment.

FIG. 3 illustrates an example signaling diagram depicting an example in which a context already exists to receive data for a multicast session, according to one embodiment. As illustrated in the example of FIG. 3, at 302, SMF1 may inform PSA UPF 1 that it will start receiving data for a multicast session, e.g., via a PFCP session creation/modification request that is extended so that SMF1 indicates that PSA UPF 1 will be receiving data for MBS session 1. As further illustrated in the example of FIG. 3, at 304, PSA UPF1 may detect that a context already exists for the received MBS session 1. In this case, at 306, the PSA UPF 1 may send back a "context exists indicator," and optionally including an F-TEID and an internet protocol address, to SMF 1. This may trigger, at 308, SMF1 to detect that no tunnel set up is required.

Figure 4:
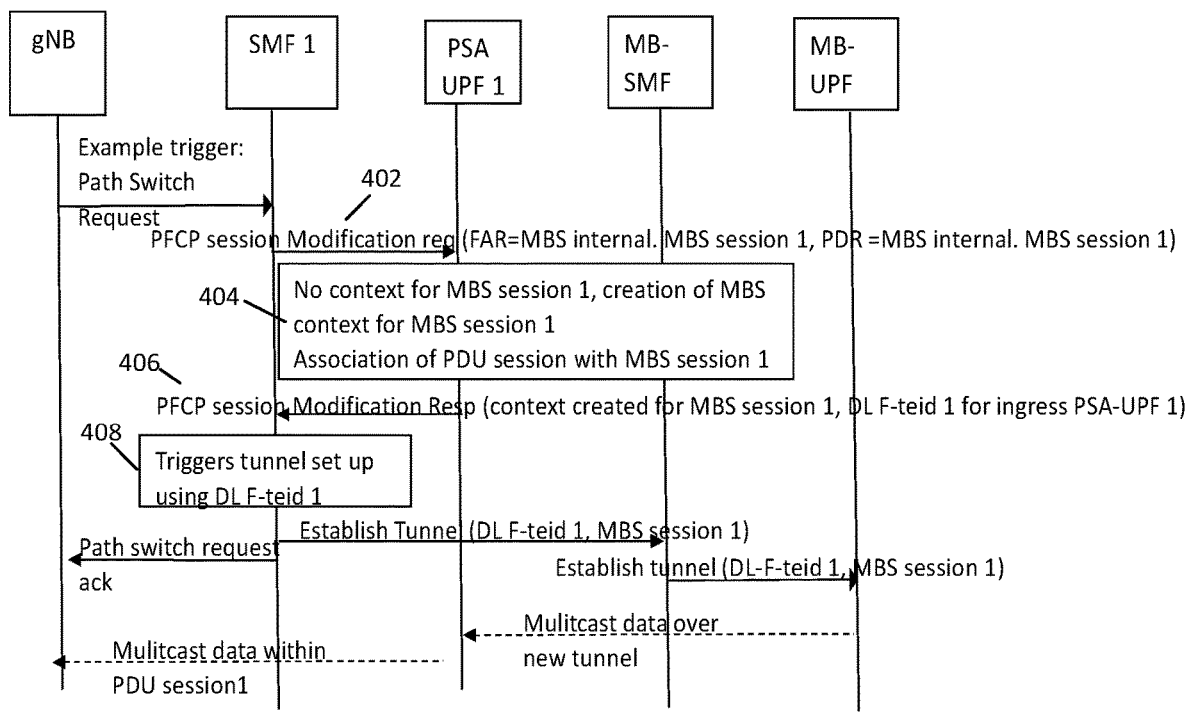
FIG. 4 illustrates an example signaling diagram, according to an embodiment.

FIG. 4 illustrates an example signaling diagram depicting the creation of a context to receive data for a multicast session combined with the configuring of a PDU session to forward data, according to one embodiment. As illustrated in the example of FIG. 4, at 402, SMF1 may inform PSA UPF 1 that it will start receiving data for a multicast session and that it will forward the data in a PDU session. In this example, the PFCP session creation/modification request is extended so that SMF1 indicates that PSA UPF 1 will be receiving data for MBS session 1 and that it will forward data from the MBS session within a PDU session. As further illustrated in the example of FIG. 4, at 404, PSA UPF1 may detect that no MBS context exists yet for the received MBS session 1. In this case, the PSA UPF 1 may create a context for MBS session 1 and, at 406, send back a "context created indicator" and an F-TEID and an internet protocol address to SMF 1. This may trigger, at 408, SMF1 to set up a tunnel between MB-UPF and PSA UPF 1 using the received F-TEID and the internet protocol address serving as PSA UPF 1 ingress point for receiving the multicast data. The PSA UPF may also configure the PDU session context to associate it with MBS session and forward related data.

Figure 5:
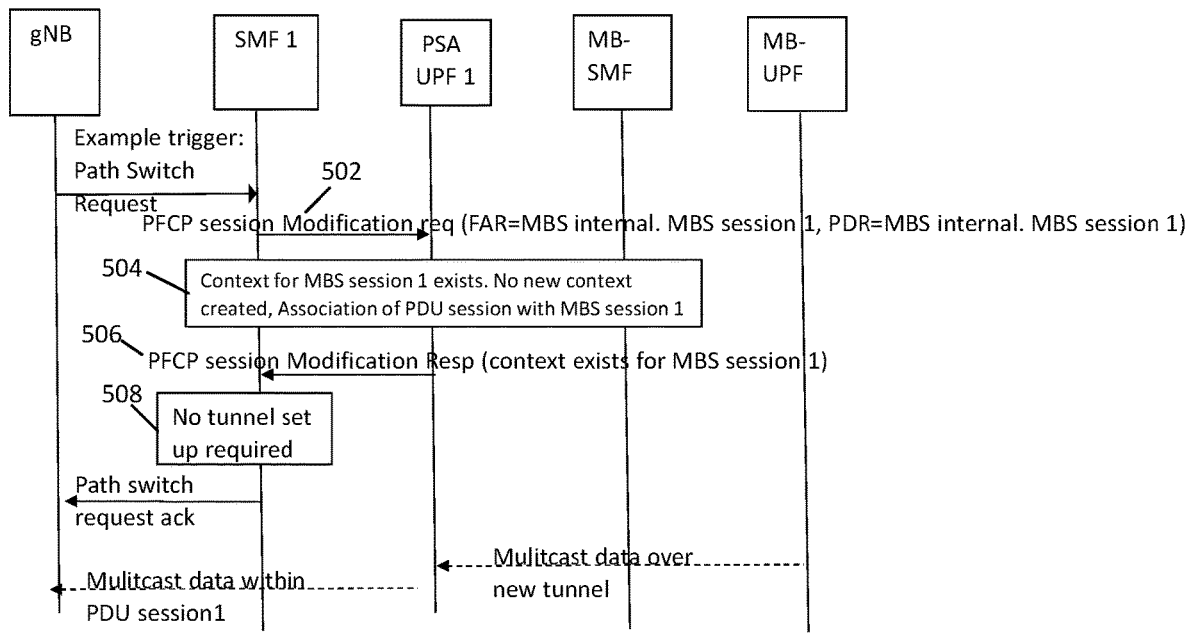
FIG. 5 illustrates an example signaling diagram, according to an embodiment.

FIG. 5 illustrates an example signaling diagram depicting an example in which a context already exists to receive data for a multicast session, according to one embodiment. As illustrated in the example of FIG. 5, at 502, SMF1 may inform PSA UPF 1 that it will start receiving data for a multicast session and that it will forward the data in a PDU session. In this example, the PFCP session creation/modification request is extended so that SMF1 indicates that PSA UPF 1 will be receiving data for MBS session 1 and that it will forward data from the MBS session within a PDU session. As further illustrated in the example of FIG. 5, at 504, PSA UPF1 may detect that a context already exists for the received MBS session 1. In this case, at 506, the PSA UPF 1 may send back a "context exists indicator," and optionally including an F-TEID and an internet protocol address, to SMF 1. This may trigger, at 508, SMF1 to detect that no tunnel set up is required and therefore not setup a tunnel. In this example, the PSA UPF also configures PDU session context to associate it with MBS session and forward related data.

Figure 6:
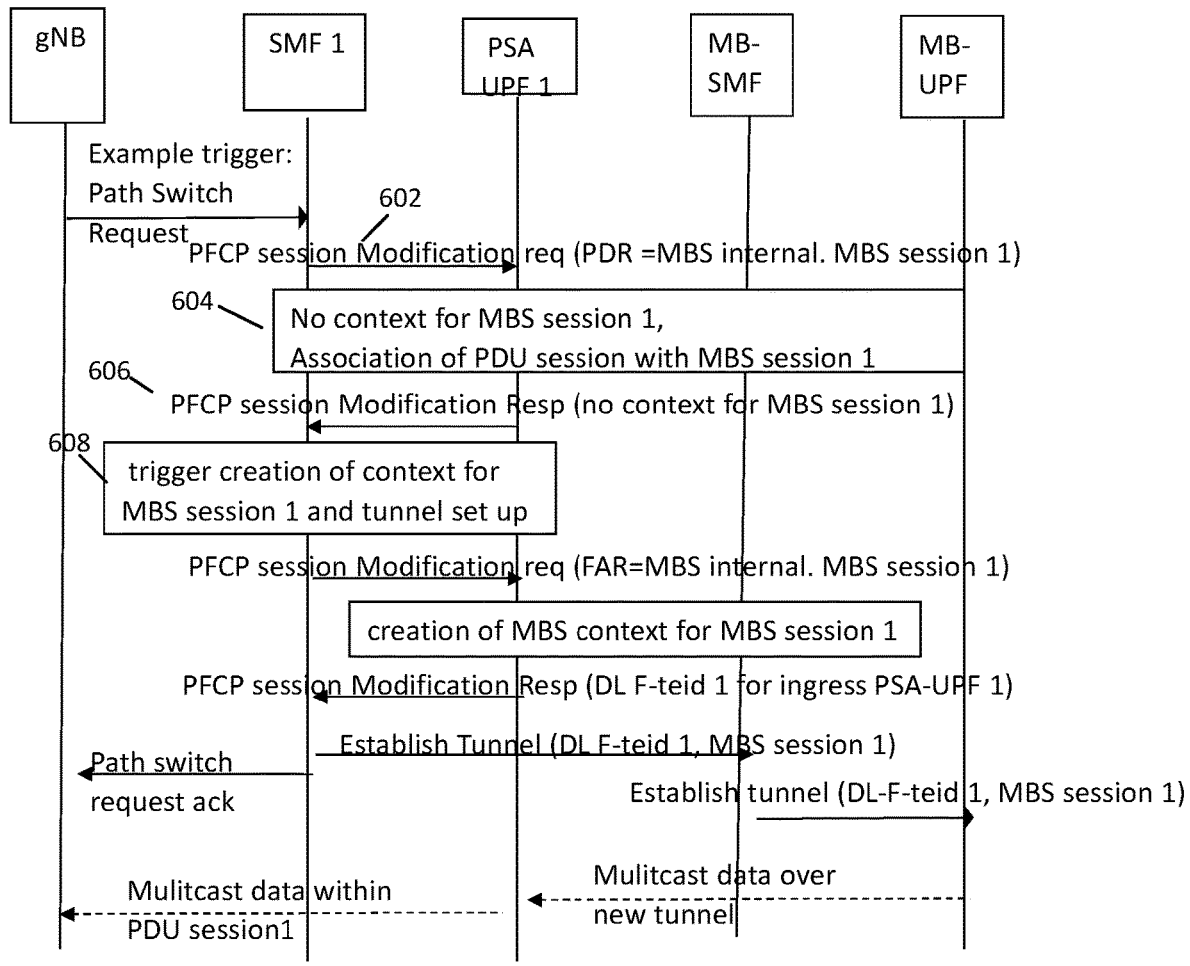
FIG. 6 illustrates an example signaling diagram, according to an embodiment.

FIG. 6 illustrates an example signaling diagram depicting the configuring of a PDU session to forward data related to an MBS session, according to one embodiment. As illustrated in the example of FIG. 6, at 602, SMF1 may inform PSA UPF 1 that it will forward data for a multicast session in a PDU session. In this example, the PFCP session creation/modification request is extended so that SMF1 indicates that PSA UPF 1 will forward data from the MBS session 1 within a PDU session. As further illustrated in the example of FIG. 6, at 604, PSA UPF1 may detect that no MBS context exists yet for the received MBS session 1. In this case, at 606, the PSA UPF 1 may send back a "context missing indicator". This may trigger, at 608, SMF1 to request from PSA UPF1 the creation of a context to receive multicast data from MB-UPF1 and to set up a tunnel between MB-UPF and PSA UPF 1. The PSA UPF may also configure the PDU session context to associate it with MBS session and forward related data.

Figure 7:
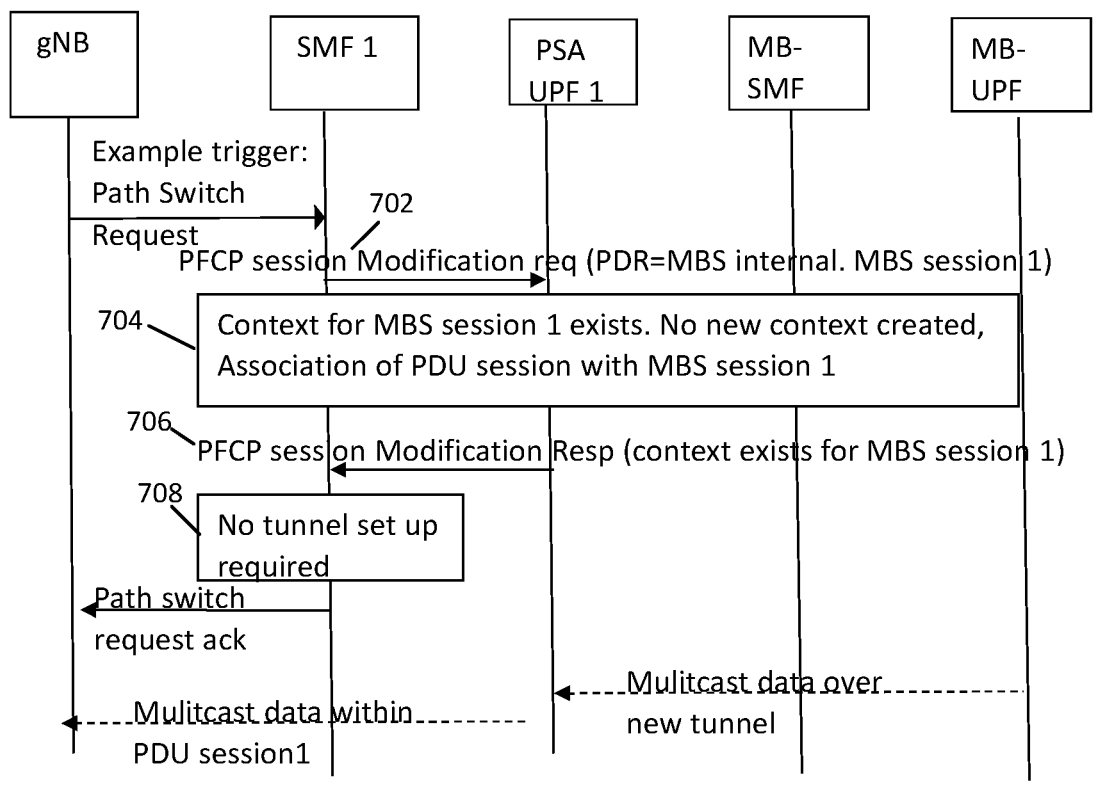
FIG. 7 illustrates an example signaling diagram, according to an embodiment.

FIG. 7 illustrates an example signaling diagram depicting an example in which a context already exists to receive data for a multicast session, according to one embodiment. As illustrated in the example of FIG. 7, at 702, SMF1 may inform PSA UPF 1 that it will forward data for a multicast session in a PDU session. In this example, the PFCP session creation/modification request is extended so that SMF1 indicates that PSA UPF 1 will forward data from the MBS session 1 within a PDU session. As further illustrated in the example of FIG. 7, at 704, PSA UPF1 may detect that a context already exists for the received MBS session 1. In this case, at 706, the PSA UPF 1 may send back a "context exists indicator" to SMF 1. This may trigger, at 708, SMF1 to not setup a tunnel. In this example, the PSA UPF may also configure PDU session context to associate it with MBS session and forward related data.

Figure 8:
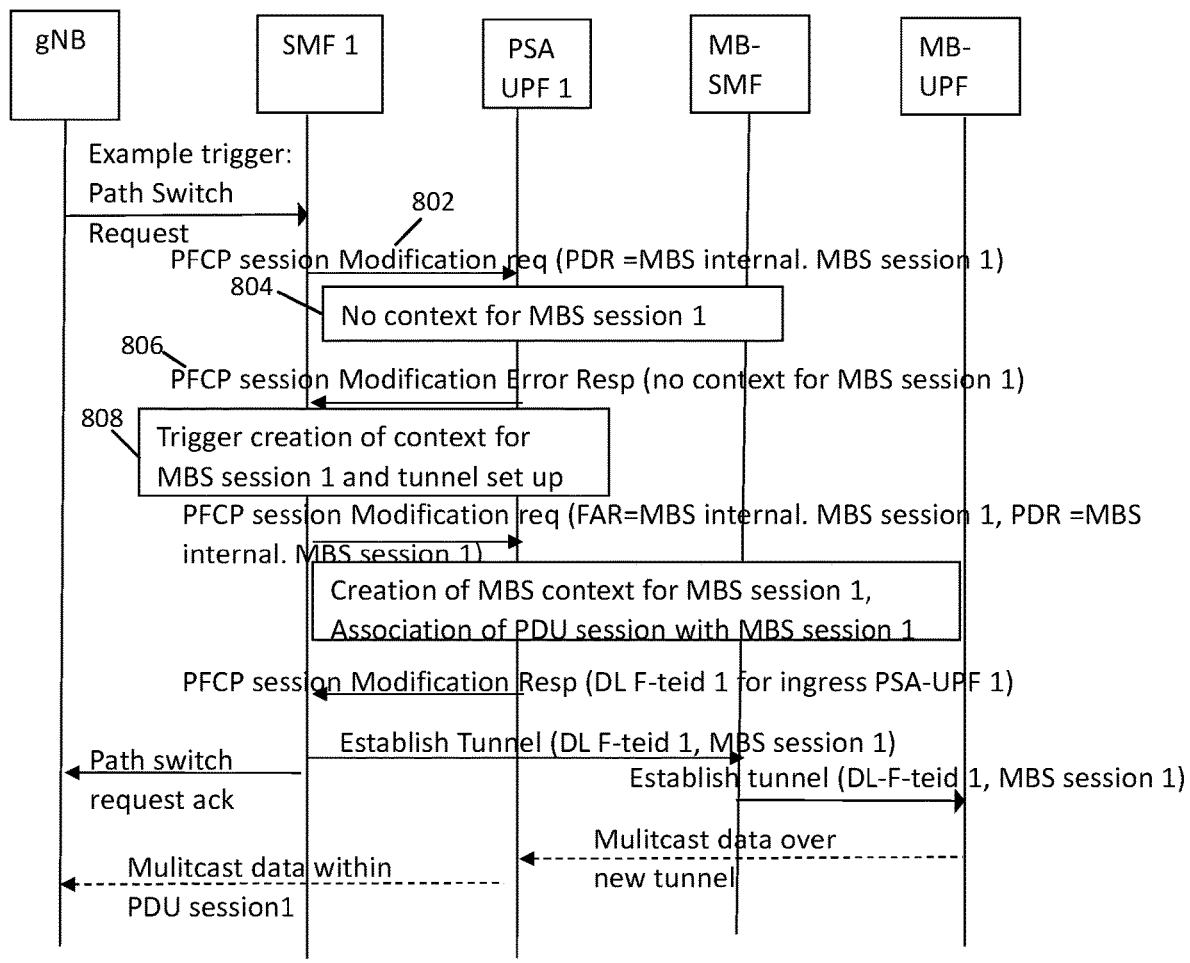
FIG. 8 illustrates an example signaling diagram, according to an embodiment.

FIG. 8 illustrates an example signaling diagram depicting the configuring of a PDU session to forward data related to an MBS session with an error response, according to one embodiment. As illustrated in the example of FIG. 8, at 802, SMF1 may inform PSA UPF 1 that it will forward data for a multicast session in a PDU session. In this example, the PFCP session creation/modification request is extended so that SMF1 indicates that PSA UPF 1 will forward data from the MBS session 1 within a PDU session. As further illustrated in the example of FIG. 8, at 804, PSA UPF1 may detect that no MBS context exists yet for the received MBS session 1. In this case, at 806, the PSA UPF 1 may send back an error response with a "context missing indicator". This may trigger, at 808, SMF1 to request from PSA UPF 1 the creation of a context to receive multicast data from MB-UPF1 (which request may also contain the request to configure the PDU session to forward data related to the MBS session) and to set up a tunnel between MB-UPF and PSA UPF 1.

Figure 9:
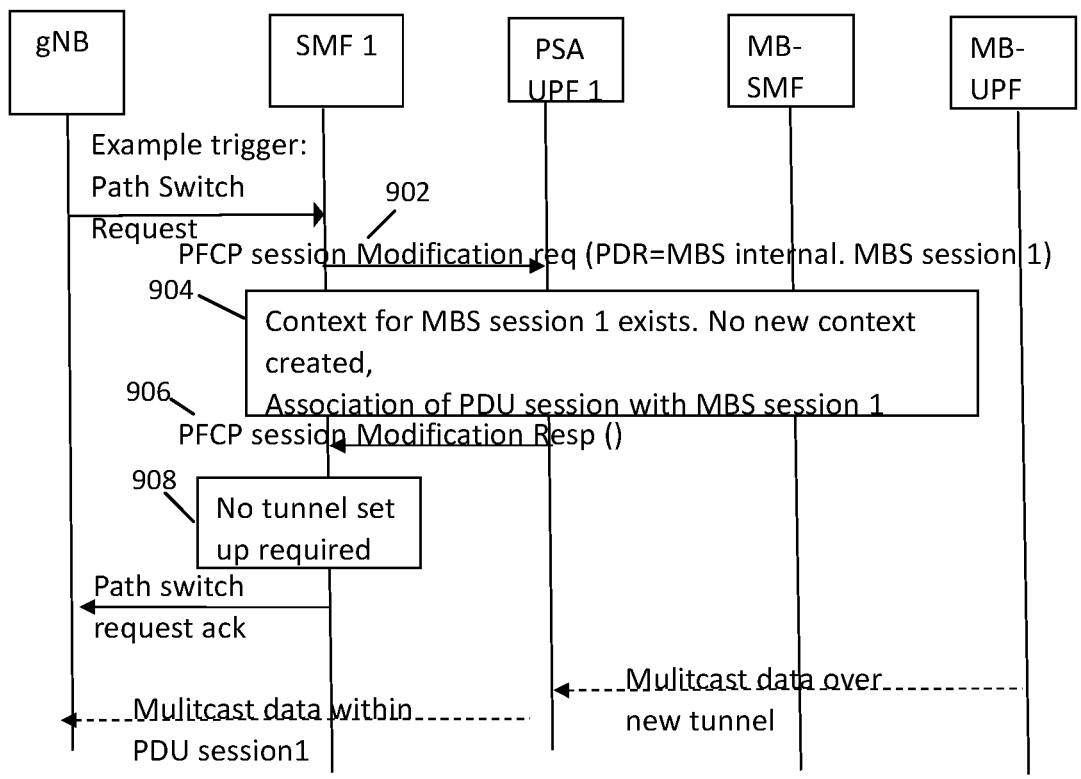
FIG. 9 illustrates an example signaling diagram, according to an embodiment.

FIG. 9 illustrates an example signaling diagram depicting the configuring of a PDU session to forward data related to an MBS session with an error response, according to one embodiment. As illustrated in the example of FIG. 9, at 902, SMF1 may inform PSA UPF 1 that it will forward data for a multicast session in a PDU session. In this example, the PFCP session creation/modification request is extended so that SMF1 indicates that PSA UPF 1 will forward data from the MBS session 1 within a PDU session. As further illustrated in the example of FIG. 9, at 904, PSA UPF1 may detect that a context already exists for the received MBS session 1. In this case, at 906, the PSA UPF 1 may configure PDU session context to associate it with MBS session and forward related data. This may trigger, at 908, SMF1 to decide that no tunnel setup is required.

Figure 10:
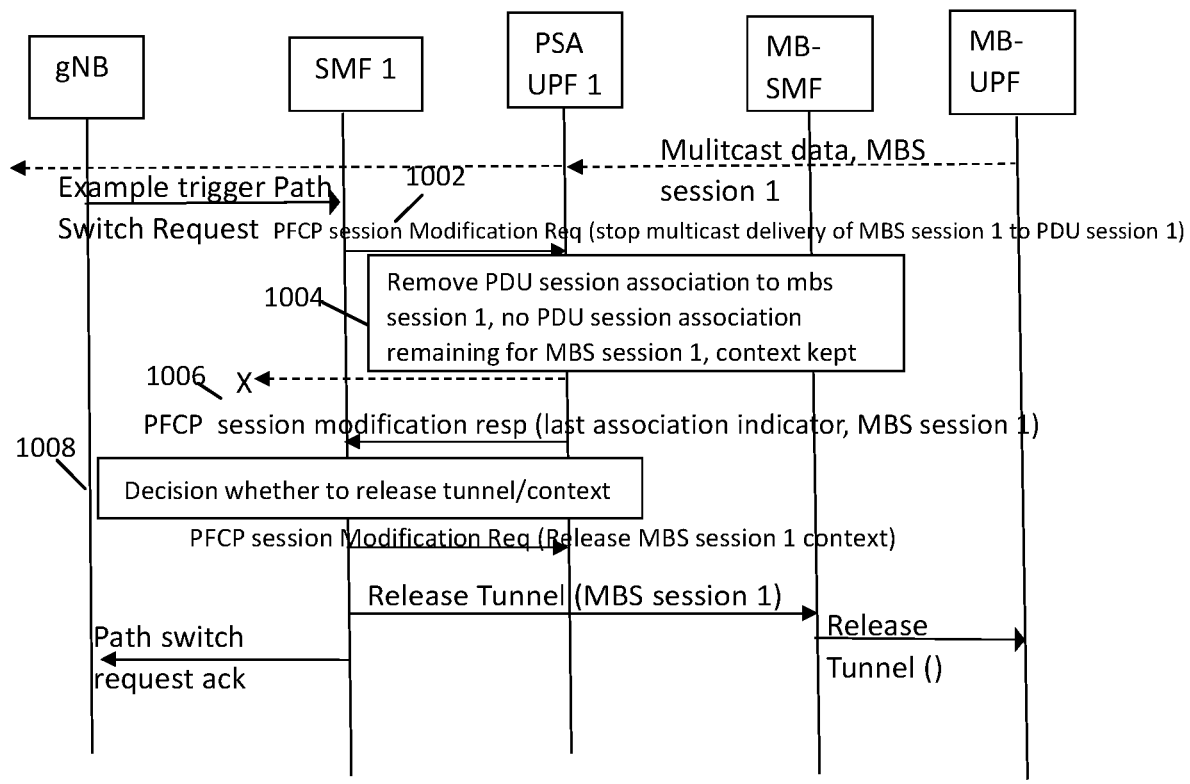
FIG. 10 illustrates an example signaling diagram, according to an embodiment.

FIG. 10 illustrates an example signaling diagram depicting the deletion of an association between a PDU session and an MBS session, according to one embodiment. As illustrated in the example of FIG. 10, at 1002, SMF1 may inform PSA UPF 1 that it will stop multicast traffic forwarding of MBS session 1 over a PDU session 1. In this example, the SMF1 may indicate to remove a PDR associated to a multicast session. As further illustrated in the example of FIG. 10, at 1004, PSA UPF1 may de-associate the PDU session 1 from MBS session 1 context and stop delivering multicast data over PDU session 1. If the PSA UPF1 detects that there is no remaining PDU session associated to the MBS session 1 context, then several options are provided for removal of the MBS session 1 context in the PSA UPF1 and for removal of the tunnel between PSA UPF1 and MB-UPF. In the example of FIG. 10, the PSA UPF1 may keep the MBS session 1 context and, at 1006, may send back a "last association removed indicator" to SMF1. This may trigger the SMF1, at 1008, to decide whether to keep the context/tunnel. If SMF1 decides to release the context/tunnel, then SMF1 may request PSA UPF1 to release the MBS session context and request MB-UPF (e.g., via MB-SMF) to release the tunnel.

Figure 11:
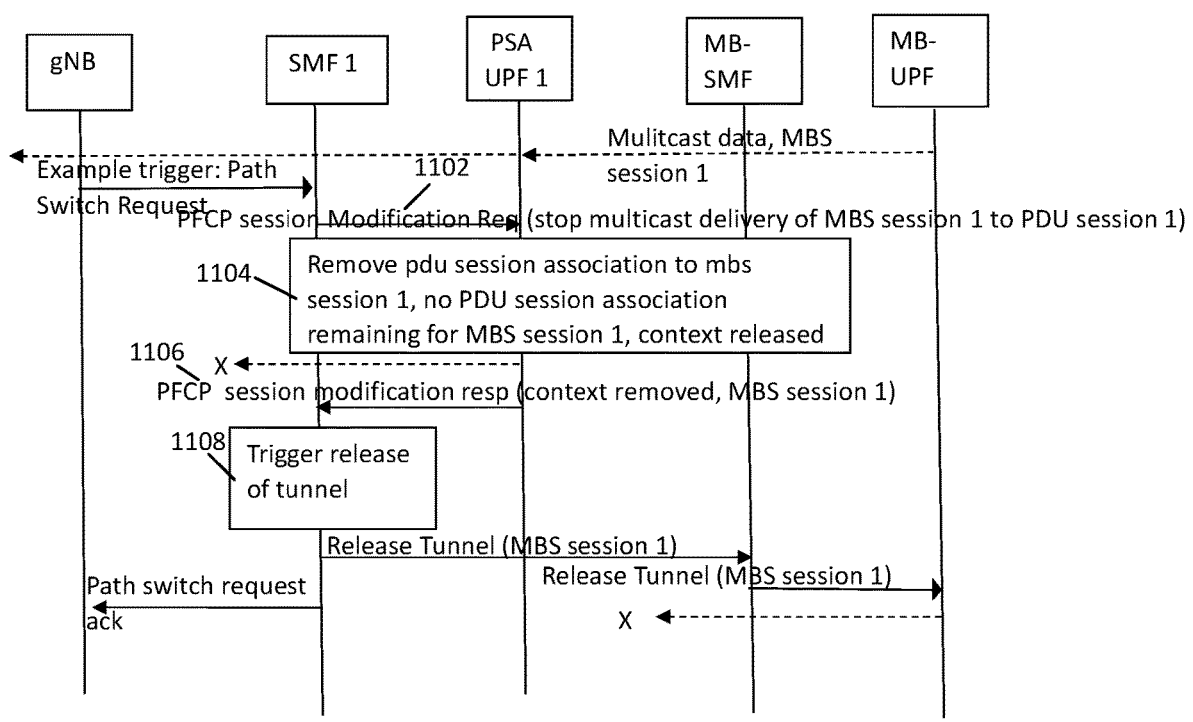
FIG. 11 illustrates an example signaling diagram, according to an embodiment.

FIG. 11 illustrates an example signaling diagram depicting the deletion of an association between a PDU session and an MBS session, according to one embodiment. As illustrated in the example of FIG. 11, at 1102, SMF1 may inform PSA UPF 1 that it will stop multicast traffic forwarding of MBS session 1 over a PDU session 1. In this example, the SMF1 may indicate to remove a PDR associated to a multicast session. As further illustrated in the example of FIG. 11, at 1104, PSA UPF1 may de-associate the PDU session 1 from MBS session 1 context and stop delivering multicast data over PDU session 1. The example of FIG. 11 depicts an implicit release of MBS context in the PSA UPF1. For instance, if the PSA UPF1 detects that there is no remaining PDU session associated to the MBS session 1 context, the PSA UPF1 may release the MBS session 1 context and, at 1106, may send back a "MBS session removed indicator" to SMF1. This may trigger the SMF1, at 1108, to request MB-UPF (e.g., via MB-SMF) to release the tunnel.

Figure 12:
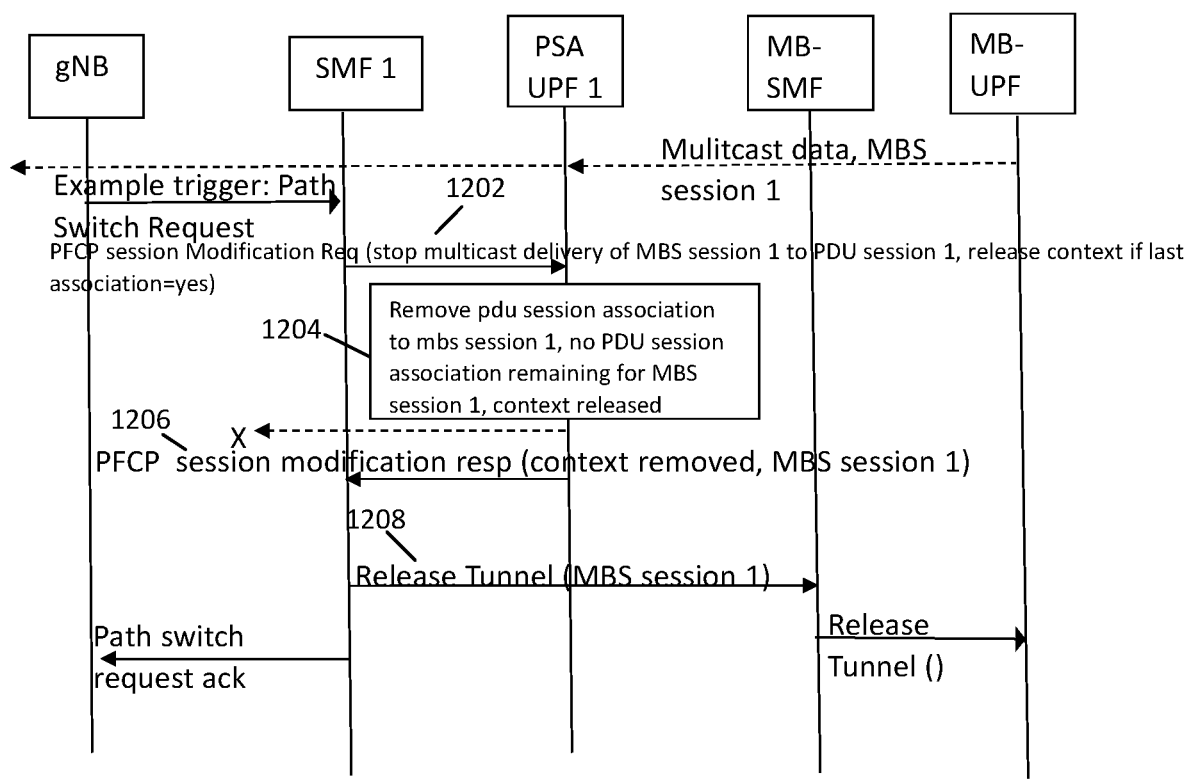
FIG. 12 illustrates an example signaling diagram, according to an embodiment.

FIG. 12 illustrates an example signaling diagram depicting the deletion of an association between a PDU session and an MBS session, according to one embodiment. As illustrated in the example of FIG. 12, at 1202, SMF1 may inform PSA UPF 1 that it will stop multicast traffic forwarding of MBS session 1 over a PDU session 1, e.g., via a PFCP session modification request. In the example of FIG. 12, the PFCP session modification request may include a "release context if last association indicator yes/no". This may control and/or trigger the PSA UPF1 to release or not release the MBS session 1 context when the last association is removed. For example, if the "release context if last associate indicator" is set to "yes," then the PSA UPF1 may be triggered to release the context when the last association is removed. In this example, the SMF1 may indicate to remove a PDR associated to a multicast session. As further illustrated in the example of FIG. 12, at 1204, PSA UPF1 may de-associate the PDU session 1 from MBS session 1 context and, since no PDU session is remaining, may release the context. For instance, if MBS session 1 context is released the PSA UPF1 may send back, at 1206, a "MBS session 1 context removed indicator." This may trigger in turn the SMF1, at 1208, to request MB-UPF (via MB-SMF) to release the tunnel.

Figure 13:
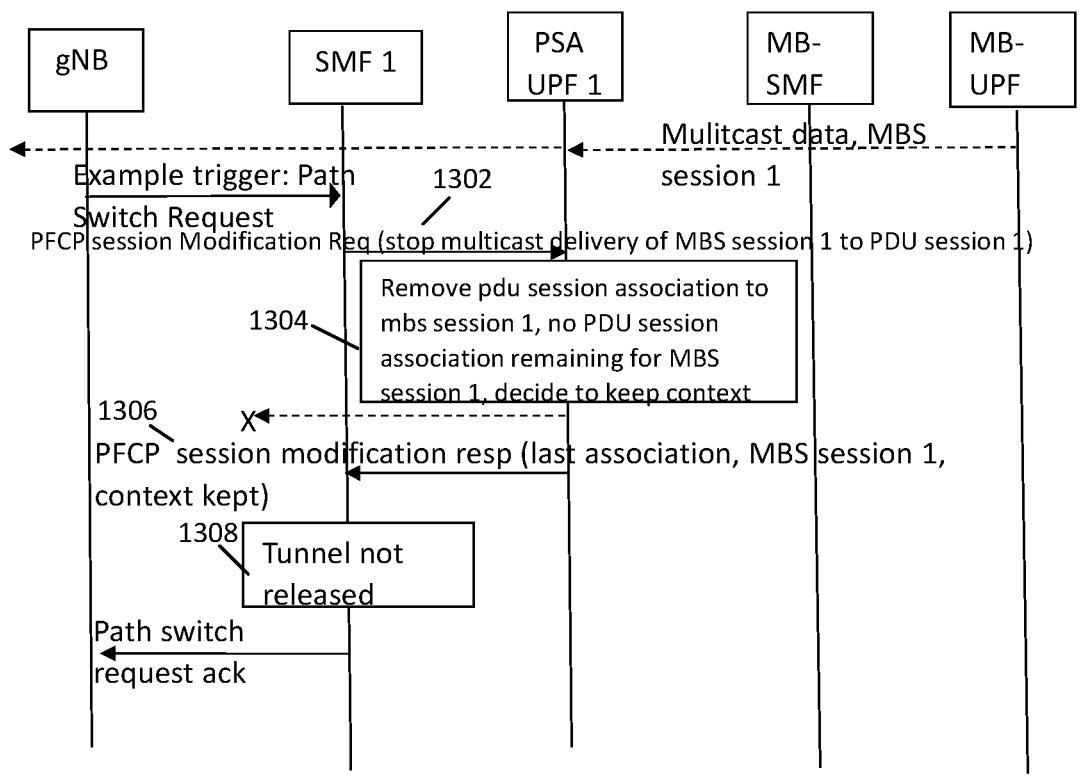
FIG. 13 illustrates an example signaling diagram, according to an embodiment.

FIG. 13 illustrates an example signaling diagram depicting the deletion of an association between a PDU session and an MBS session, according to one embodiment. As illustrated in the example of FIG. 13, at 1302, SMF1 may inform PSA UPF 1 that it will stop multicast traffic forwarding of MBS session 1 over a PDU session 1. In this example, the decision to keep or release the MBS session 1 context may be controlled by the PSA UPF1. As further illustrated in the example of FIG. 13, at 1304, PSA UPF1 may de-associate the PDU session 1 from MBS session 1 context and stop delivering multicast data over PDU session 1. In the example of FIG. 13, if the PSA UPF1 detects that there is no remaining PDU session associated to the MBS session 1 context, then PSA UPF1 may decide to keep the MBS session context and, at 1306, may send back an indication to SMF1 of the decision to keep the MBS session context. This may trigger the SMF1, at 1308, to not release the tunnel.

Figure 14A:
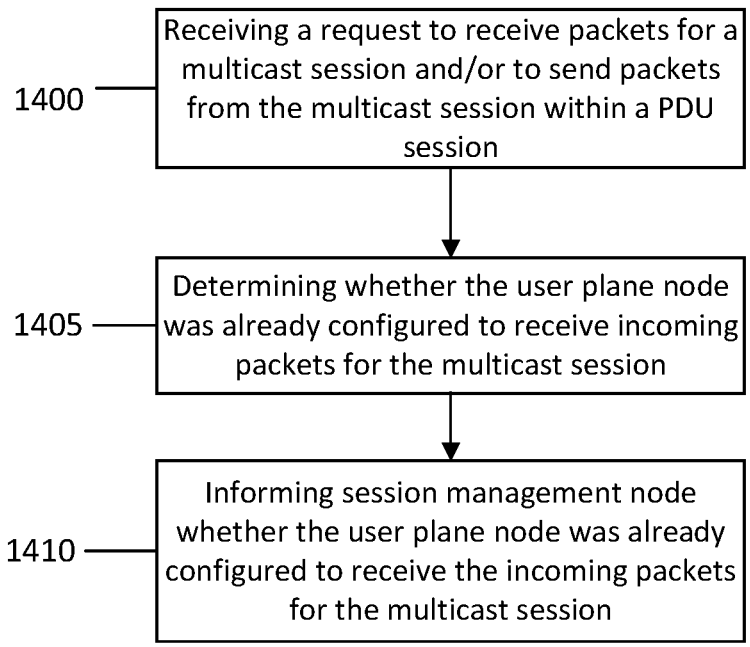
FIG. 14A illustrates an example flow diagram of a method, according to an embodiment.

FIG. 14A illustrates an example flow diagram of a method for distributing multicast packets, according to an example embodiment. In certain example embodiments, the flow diagram of FIG. 14A may be performed by a network entity or network node in a communications system, such as LTE or 5G NR. In some example embodiments, the network entity performing the method of FIG. 14A may include or be included in a base station, access node, node B, eNB, gNB, NG-RAN node, transmission-reception points (TRPs), high altitude platform stations (HAPS), relay station or the like. In one embodiment, the network node performing the method of FIG. 14A may include a user plane node, UPF or PSA UPF, such as the PSA UPF illustrated in the examples of FIGS. 2-13, or similar radio node.

As illustrated in the example of FIG. 14A, the method may include, 1400, receiving a request, from a session management node or SMF, to receive packets for a multicast session and/or to send packets from the multicast session within a PDU session. The multicast session may include a MBS session. In one example, the receiving 1400 of the request may include receiving a PFCP session creation or modification request comprising an indication that the user plane node will be receiving data for the multicast session.

According to certain embodiments, the method of FIG. 14A may include, at 1405, determining whether the user plane node was already configured to receive incoming packets for the multicast session. The method may also include, at 1410, informing the session management node or SMF as to whether the user plane node was already configured to receive the incoming packets for the multicast session.

In some embodiments, when it is determined that the user plane node is not yet configured to receive the incoming packets for the multicast session, the method may include creating a context for the multicast session and transmitting a context created indicator to the session management node. According to certain embodiments, an internet protocol (IP) address and a tunnel endpoint identifier (TEID) may be transmitted with the context created indicator or the context exists indicator. Alternatively, when it is determined that the user plane node is already configured to receive the incoming packets for the multicast session, the method may include transmitting a context exists indicator to the session management node.

According to certain embodiments, the receiving 1400 may include receiving a packet forwarding control protocol (PFCP) session creation or modification request comprising indication that the user plane node will be receiving data for the multicast session and will be forwarding data from the multicast session within a protocol data unit (PDU) session. In some embodiments, when it is determined that the user plane node is not yet configured to receive the incoming packets for the multicast session, the method may include creating a context for the multicast session, transmitting a context created indicator to the session management node, and configuring the protocol data unit (PDU) session context to associate it with the multicast session and forward related data. Alternatively, when it is determined that the user plane node is already configured to receive the incoming packets for the multicast session, the method may include transmitting a context exists indicator to the session management node and configuring the protocol data unit (PDU) session context to associate it with the multicast session and forward the related data.

According to certain embodiments, the receiving 1400 may include receiving a packet forwarding control protocol (PFCP) session creation or modification request comprising an indication that the user plane node will be forwarding data from the multicast session within a protocol data unit (PDU) session. In some embodiments, when it is determined that the user plane node is not yet configured to receive the incoming packets for the multicast session, the method may include transmitting a context missing indicator to the session management tunnel node, and configuring the protocol data unit (PDU) session context to associate it with the multicast session and forward related data. Alternatively, when it is determined that the user plane node is already configured to receive the incoming packets for the multicast session, the method may include transmitting a context exists indicator to the session management node, and configuring the protocol data unit (PDU) session context to associate it with the multicast session and forward related data.

In some embodiments, when it is determined that the user plane node is not yet configured to receive the incoming packets for the multicast session, the method may include transmitting an error response comprising a context missing indicator to the session management node. Alternatively, when it is determined that the user plane node is already configured to receive the incoming packets for the multicast session, the method may include configuring the protocol data unit (PDU) session context to associate it with the multicast session and forward related data.

According to certain embodiments, the method may include receiving an indication, from the session management node (or SMF), to terminate forwarding the packets for the multicast session to the protocol data unit (PDU) session, determining whether there are remaining other protocol data unit (PDU) sessions to which packets from the multicast session are to be sent, and informing the session management node if there are no other protocol data unit (PDU) sessions to which packets from the multicast session are to be sent. In some embodiments, the receiving of the indication to terminate the forwarding of packets may include receiving an indication to remove a packet detection rule (PDR) associated to the multicast session. In certain embodiments, the method may include de-associating the protocol data unit (PDU) session from the multicast session context and stopping the forwarding of multicast data over the protocol data unit (PDU) session. According to an embodiment, when it is determined that there are no remaining protocol data unit (PDU) sessions associated to the multicast session context, the method may include maintaining the multicast session context, transmitting a last association removed indicator to the session management node, and optionally receiving a request from the session management node to release the multicast session context and associated tunnel endpoint identifier. In an embodiment, when it is determined that there are no remaining protocol data unit (PDU) sessions associated to the multicast session context, the method may include releasing the multicast session context and transmitting a multicast session removed indicator to the session management node.

In some embodiments, when it is determined that there are no remaining protocol data unit (PDU) sessions associated to the multicast session context, the method may include determining whether to release the multicast session context based on a release context indicator included in a packet forwarding control protocol (PFCP) session or modification request and, when it is determined to release the multicast session context, transmitting a multicast session context removed indicator to the session management node. The release context indicator may be configured to trigger the user plane node to release or not release the multicast session context when the last association is removed. According to an embodiment, when it is determined that there are no remaining protocol data unit (PDU) sessions associated to the multicast session context, the method may include deciding, by the user plane node, whether or not to maintain the multicast session context and informing the session management node of the decision of whether to maintain the multicast session context.

According to certain embodiments, the method may include receiving a request from a session management node (or SMF) to terminate receiving packets for the multicast session, determining whether there are remaining other protocol data unit (PDU) sessions to which packets from the multicast session are to be sent, and determining whether the user plane node is configured to send packets from the multicast session to protocol data unit (PDU) sessions. If there are protocol data unit (PDU) sessions to which packets from the multicast session are to be sent, the method may include not executing or ignoring the request to terminate receiving packets for the multicast session and informing the session management node that there are protocol data unit (PDU) sessions to which packets from the multicast session are to be sent.

In some embodiments, the method may include receiving a request from a session management node (or SMF) to terminate receiving packets for the multicast session, and determining whether the user plane node was configured to receive packets from the multicast session. If the user plane node was not configured to receive packets from the multicast session, the method may include not executing or ignoring the request to terminate receiving packets for the multicast session, and informing the session management node whether the user plane node was configured to receive packets from the multicast session.

Figure 14B:
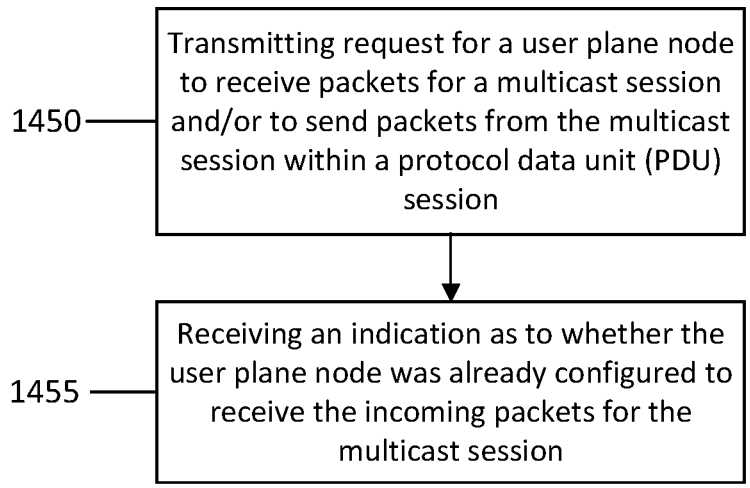
FIG. 14B illustrates an example flow diagram of a method, according to an embodiment.

FIG. 14B illustrates an example flow diagram of a method for distributing multicast packets, according to an example embodiment. In certain example embodiments, the flow diagram of FIG. 14B may be performed by a network entity or network node in a communications system, such as LTE or 5G NR. In some example embodiments, the network entity performing the method of FIG. 14B may include or be included in a base station, access node, node B, eNB, gNB, NG-RAN node, transmission-reception points (TRPs), high altitude platform stations (HAPS), relay station or the like. In one embodiment, the network node performing the method of FIG. 14B may include a session management node or SMF, such as the SMF 1 illustrated in the examples of FIGS. 2-13, or similar radio node.

As illustrated in the example of FIG. 14B, the method may include, 1450, transmitting, to a user plane node or UPF, a request for the user plane node to receive packets for a multicast session and/or to send packets from the multicast session within a protocol data unit (PDU) session. The multicast session may be a MBS session, for example.

According to an embodiment, the method may also include, at 1455, receiving an indication as to whether the user plane node was already configured to receive the incoming packets for the multicast session.

In certain embodiments, if the user plane node was not configured to receive the incoming packets for the multicast session, the method may include configuring user plane node to receive the incoming packets for the multicast session. According to a further embodiment, if the user plane node was not configured to receive the incoming packets for the multicast session, the method may include sending a request to another (i.e., third) node to send data for the multicast session to the user plane node.

According to some embodiments, the transmitting 1450 may include transmitting a packet forwarding control protocol (PFCP) session creation or modification request comprising an indication that the user plane node will be receiving data for the multicast session. In certain embodiments, the method may include receiving, from the user plane node, a context created indicator to indicate creation of a context for the multicast session, an IP address and a tunnel endpoint identifier (TEID), and establishing a tunnel between a multicast broadcast user plane function (MB-UPF) and the user plane node using the received IP address and tunnel endpoint identifier (TEID) to serve as an ingress point for receiving the multicast data. Alternatively, in an embodiment, the method may include receiving, from the user plane node, a context exists indicator to indicate a context already exists for the multicast session and deciding to not establish a new tunnel.

In certain embodiments, the transmitting 1450 may include transmitting a packet forwarding control protocol (PFCP) session creation or modification request comprising an indication that the user plane node will be receiving data for the multicast session and will be forwarding data from the multicast session within a protocol data unit (PDU) session. According to an embodiment, the method may include receiving, from the user plane node, a context created indicator to indicate creation of a context for the multicast session, an IP address and a tunnel endpoint identifier (TEID), and establishing a tunnel between a multicast broadcast user plane function (MB-UPF) and the user plane node using the received IP address and tunnel endpoint identifier (TEID) to serve as an ingress point for receiving the multicast data. Alternatively, in an embodiment, the method may include receiving, from the user plane node, a context exists indicator to indicate a context already exists for the multicast session.

According to some embodiments, the transmitting 1450 may include transmitting a packet forwarding control protocol (PFCP) session creation or modification request comprising an indication that the user plane node will be forwarding data from the multicast session within a protocol data unit (PDU) session. In an embodiment, the method may include receiving, from the user plane node, a context missing indicator to indicate that a context for the multicast session is missing, requesting the creation of a context to receive multicast data from a multicast broadcast user plane function (MB-UPF), and establishing a tunnel between the multicast broadcast user plane function (MB-UPF) and the user plane node. Alternatively, in an embodiment, the method may include receiving, from the user plane node, a context exists indicator to indicate a context already exists for the multicast session.

According to a further embodiment, the method may include receiving, from the user plane node, an error response comprising a context missing indicator to indicate that a context for the multicast session is missing, triggering the session management node to further request the user plane node to create a context to receive multicast data from a multicast broadcast user plane function (MB-UPF), and establishing a tunnel between the multicast broadcast user plane function (MB-UPF) and the user plane node. Alternatively, in an embodiment, the method may include receiving, from the user plane node, a context exists indicator to indicate a context already exists for the multicast session.

In some embodiments, the method may include transmitting an indication, to the user plane node, to terminate forwarding the packets for the multicast session to the protocol data unit (PDU) session, and receiving, from the user pane node, an indication of whether there are other protocol data unit (PDU) sessions to which packets from the multicast session are to be sent. According to one embodiment, if there are no other protocol data unit (PDU) sessions to which packets from the multicast session are to be sent, the method may include configuring the user plane node to terminate receiving the incoming packets for the multicast session. In an embodiment, if there are no other protocol data unit (PDU) sessions to which packets from the multicast session are to be sent, the method may include sending a request to a third node to terminate sending data for the multicast session to the user plane node. According to some embodiments, the transmitting of the indication to terminate the forwarding of the packets may include transmitting an indication to the user plane node to remove a packet detection rule (PDR) associated to the multicast session.

According to certain embodiments, the method may include receiving a last association removed indicator from the user plane node, deciding whether to release at least one of the multicast session context or the established tunnel, and when it is decided to release the at least one of the multicast session context or the established tunnel, requesting the user plane node to release the multicast session context and/or requesting the multicast broadcast user plane function (MB-UPF) to release the tunnel.

In some embodiments, the method may include receiving a multicast session removed indicator from the user plane node and requesting the multicast broadcast user plane function (MB-UPF) to release the tunnel.

According to certain embodiments, the method may include providing, to the user plane node, a release context indicator in a packet forwarding control protocol (PFCP) session or modification request and, when the multicast session context is released by the user plane node, receiving a multicast session context removed indicator and requesting the multicast broadcast user plane function (MB-UPF) to release the tunnel. The release context indicator may be configured to trigger the user plane node to release or not release the multicast session context when the last association is removed.

In some embodiments, the method may include receiving an indication, from the user plane node, of its decision of whether or not to release the multicast session context and, when the indication indicates that the user plane node is releasing the multicast session context, requesting the multicast broadcast user plane function (MB-UPF) to release the tunnel.

According to certain embodiments, the method may include transmitting an indication to a user plane node to terminate receiving packets for the multicast session, and receiving, from the user pane node, an indication that there are protocol data unit (PDU) sessions to which packets from the multicast session are to be sent.

In some embodiments, the method may include transmitting an indication to a user plane node to terminate receiving packets for the multicast session, and receiving, from the user pane node, an indication whether the user plane function was configured to receive packets from the multicast session. According to an embodiment, if the user plane function was configured to receive packets from the multicast session, the method may include sending a request to a third node to terminate sending data for the multicast session to the user plane function.

Figure 15:
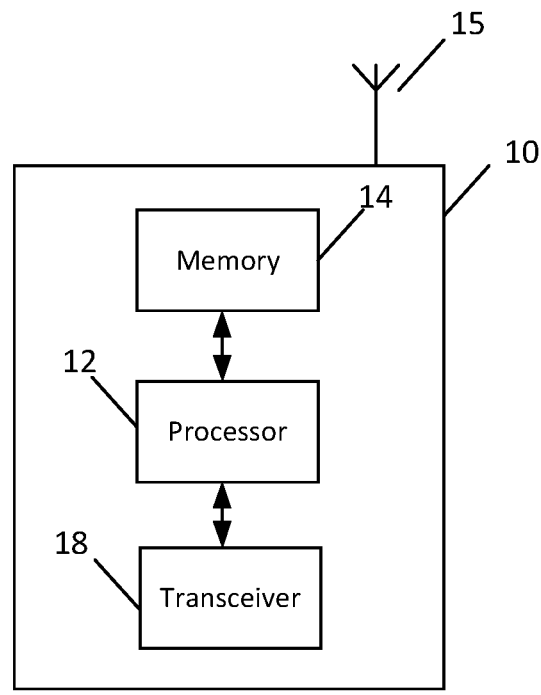
FIG. 15 illustrates an example block diagram of apparatuses, according to an embodiment.
Figure 15:
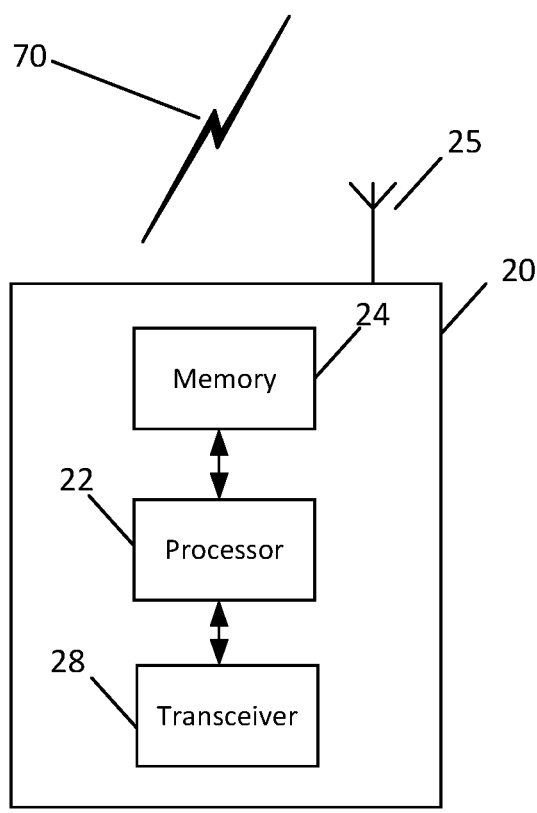

FIG. 15 illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be a user plane node, UPF or PSA UPF, such as the PSA UPF illustrated in the examples of FIGS. 2-13, or similar radio node, for instance.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 15.

As illustrated in the example of FIG. 15, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 15, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network element or RAN node, such as a base station, access point, Node B, eNB, gNB, TRP, HAPS, IAB node, WLAN access point, or the like. In one example embodiment, apparatus 10 may be a user plane node, UPF or PSA UPF, such as the PSA UPF illustrated in the examples of FIGS. 2-13, or similar radio node. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIG. 2-13 or 14A, or any other method described herein. In some embodiments, as discussed herein, apparatus 10 may be configured to perform a procedure relating to distributing multicast packets, as discussed elsewhere herein, for example.

FIG. 15 illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like. Alternatively, apparatus 20 may be or may be included in a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In one example embodiment, apparatus 20 may be a session management node or SMF, such as the SMF 1 illustrated in the examples of FIGS. 2-13, or similar radio node.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 15.

As illustrated in the example of FIG. 15, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 15, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a session management node or SMF, such as the SMF 1 illustrated in the examples of FIGS. 2-13, or similar radio node, for example. According to certain embodiments, apparatus 20 may be controlled by memory 24 and processor 22 to perform the functions associated with any of the embodiments described herein, such as one or more of the operations illustrated in, or described with respect to FIG. 2-13 or 14B, or any other method described herein. For example, in an embodiment, apparatus 20 may be controlled to perform a process relating to distributing multicast packets, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of one or more of the operations or procedures described herein.

In view of the foregoing, certain example embodiments provide several technological improvements, enhancements, and/or advantages over existing technological processes and constitute an improvement at least to the technological field of wireless network control and/or management. For example, as discussed in detail above, certain embodiments provide methods to enable the setup, release, modification and/or management of a GTP tunnel between a user plane nodes, such as between a MB-UPF and PSA UPF. Some embodiments may allow a PSA UPF to coordinate the setup and tear down of resources to receive packets from a MBS session and the associations between those resources and resources to send those packets related to multiple PDU sessions. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A method, comprising:
   receiving, at a user plane node, a request from a session management node, to receive packets for a multicast session within a protocol data unit (PDU) session, wherein the receiving of the request comprises receiving a packet forwarding control protocol (PFCP) session creation or modification request comprising an indication that the user plane node will be receiving data for the multicast session;
   determining whether the user plane node was already configured to receive incoming packets for the multicast session; and
   informing the session management node as to whether the user plane node was already configured to receive the incoming packets for the multicast session, the method further comprising:
   when it is determined that the user plane node is not yet configured to receive the incoming packets for the multicast session, creating a context for the multicast session and transmitting a context created indicator to the session management node; or
   when it is determined that the user plane node is already configured to receive the incoming packets for the multicast session, transmitting a context exists indicator to the session management node.

2. The method of claim 1, wherein the receiving of the request comprises receiving a packet forwarding control protocol (PFCP) session creation or modification request comprising an indication that the user plane node will be forwarding data from the multicast session within a protocol data unit (PDU) session.

3. The method of claim 2, further comprising:
   when it is determined that the user plane node is not yet configured to receive the incoming packets for the multicast session,
   transmitting a context missing indicator to the session management node, and configuring a protocol data unit (PDU) session context to associate the PDU session context with the multicast session and forward related data; or when it is determined that the user plane node is already configured to receive the incoming packets for the multicast session, transmitting a context exists indicator to the session management node, and configuring the protocol data unit (PDU) session context to associate it with the multicast session and forward related data.

4. The method of claim 2, further comprising:

when it is determined that the user plane node is not yet configured to receive the incoming packets for the multicast session, transmitting an error response comprising a context missing indicator to the session management node; or when it is determined that the user plane node is already configured to receive the incoming packets for the multicast session, configuring a protocol data unit (PDU) session context to associate the PDU session context with the multicast session and forward related data.

5. A method, comprising:

transmitting, by a session management node, to a user plane node, a request for the user plane node to receive packets for a multicast session within a protocol data unit (PDU) session, wherein the transmitting of the request comprises transmitting a packet forwarding control protocol (PFCP) session creation or modification request comprising an indication that the user plane node will be receiving data for the multicast session;

receiving, at a session management node, an indication as to whether the user plane node was already configured to receive incoming packets for the multicast session, the method further comprising:

receiving a context created indicator from the user plane node; or receiving a context exists indicator from the user plane node.

6. The method of claim 5, further comprising:

if the user plane node was not configured to receive the incoming packets for the multicast session, configuring user plane node to receive the incoming packets for the multicast session.

7. The method of claim 5, further comprising:

if the user plane node was not configured to receive the incoming packets for the multicast session, sending a request to a third node to send data for the multicast session to the user plane node.

8. The method of claim 5, wherein the transmitting of the request comprises transmitting a packet forwarding control protocol (PFCP) session creation or modification request comprising an indication that the user plane node will be forwarding data from the multicast session within a protocol data unit (PDU) session.

9. The method of claim 5, further comprising:

transmitting an indication to a user plane node to terminate receiving packets for the multicast session; and receiving, from the user plane node, an indication that there are protocol data unit (PDU) sessions to which packets from the multicast session are to be sent.

10. An apparatus, comprising:

at least one processor; and at least one memory comprising computer program code, the at least one memory and computer program code configured, with the at least one processor, to cause the apparatus at least to:

receive a request, from a session management node, to receive packets for a multicast session within a protocol data unit (PDU) session, wherein the request comprises a packet forwarding control protocol (PFCP) session creation or modification request comprising an indication that the apparatus will be receiving data for the multicast session;

determine whether the apparatus was already configured to receive incoming packets for the multicast session; and inform the session management node as to whether the apparatus was already configured to receive the incoming packets for the multicast session, the at least one memory and computer program code are configured, with the at least one processor, to further cause the apparatus at least to:

when it is determined that the user plane node is not yet configured to receive the incoming packets for the multicast session, create a context for the multicast session and transmit a context created indicator to the session management node; or when it is determined that the user plane node is already configured to receive the incoming packets for the multicast session, transmit a context exists indicator to the session management node.

11. The apparatus of claim 10, wherein the request comprises a packet forwarding control protocol (PFCP) session creation or modification request comprising an indication that the apparatus will be forwarding data from the multicast session within a protocol data unit (PDU) session.

12. The apparatus of claim 11, wherein the at least one memory and computer program code are configured, with the at least one processor, to cause the apparatus at least to:

when it is determined that the apparatus is not yet configured to receive the incoming packets for the multicast session, transmit a context missing indicator to the session management node, and configure a protocol data unit (PDU) session context to associate the PDU session context with the multicast session and forward related data; or when it is determined that the apparatus is already configured to receive the incoming packets for the multicast session, transmit a context exists indicator to the session management node, and configure the protocol data unit (PDU) session context to associate it with the multicast session and forward related data.

13. The apparatus of claim 11, wherein the at least one memory and computer program code are configured, with the at least one processor, to cause the apparatus at least to:

when it is determined that the apparatus is not yet configured to receive the incoming packets for the multicast session, transmit an error response comprising a context missing indicator to the session management node; or when it is determined that the apparatus is already configured to receive the incoming packets for the multicast session, configure a protocol data unit (PDU)

session context to associate the PDU session context with the multicast session and forward related data.

14. An apparatus, comprising:
   at least one processor; and
   at least one memory comprising computer program code,
   the at least one memory and computer program code configured, with the at least one processor, to cause the apparatus at least to:
   transmit, to a user plane node, a request for the user plane node to receive packets for a multicast session within a protocol data unit (PDU) session, wherein the request comprises a packet forwarding control protocol (PFCP) session creation or modification request comprising an indication that the apparatus will be transmitting data for the multicast session;
   receive an indication as to whether the user plane node was already configured to receive incoming packets for the multicast session, the at least one memory and computer program code are configured, with the at least one processor, to further cause the apparatus at least to:
   receive a context created indicator from the user plane node; or
   receive a context exists indicator from the user plane node.

15. The apparatus of claim 14, wherein the at least one memory and computer program code are configured, with the at least one processor, to cause the apparatus at least to:
   if the user plane node was not configured to receive the incoming packets for the multicast session, configure user plane node to receive the incoming packets for the multicast session.

16. The apparatus of claim 14, wherein the at least one memory and computer program code are configured, with the at least one processor, to cause the apparatus at least to:
   if the user plane node was not configured to receive the incoming packets for the multicast session, send a request to a third node to send data for the multicast session to the user plane node.

17. The apparatus of claim 14, wherein the request comprises a packet forwarding control protocol (PFCP) session creation or modification request comprising an indication that the user plane node will be forwarding data from the multicast session within a protocol data unit (PDU) session.

18. The apparatus of claim 14, wherein the at least one memory and computer program code are configured, with the at least one processor, to cause the apparatus at least to:
   transmit an indication to a user plane node to terminate receiving packets for the multicast session; and
   receive, from the user plane node, an indication that there are protocol data unit (PDU) sessions to which packets from the multicast session are to be sent.

* * * * *